US012810726B2

(12) United States Patent
Isaac

(10) Patent No.: US 12,810,726 B2
(45) Date of Patent: Nov. 24, 2026

(54) SYSTEMS AND TECHNIQUES FOR ANALYZING DISTANCE USING ULTRASONIC SENSING

(71) Applicant: Allstate Insurance Company, Northbrook, IL (US)

(72) Inventor: Emad Isaac, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/575,072

(22) PCT Filed: Jun. 28, 2022

(86) PCT No.: PCT/US2022/035245

§ 371 (c)(1),
(2) Date: Dec. 28, 2023

(87) PCT Pub. No.: WO2023/278395

PCT Pub. Date: Jan. 5, 2023

(65) Prior Publication Data

US 2025/0124789 A1 Apr. 17, 2025

(51) Int. Cl.
*G08G 1/0967* (2006.01)
*G01S 11/14* (2006.01)

(52) U.S. Cl.
CPC ........ *G08G 1/096766* (2013.01); *G01S 11/14* (2013.01)

(58) Field of Classification Search
None
See application file for complete search history.

(56) References Cited

U.S. PATENT DOCUMENTS 5,708,421 A 1/1998 Boyd
6,304,179 B1 10/2001 Lotito et al.
(Continued)

FOREIGN PATENT DOCUMENTS

CN 107757475 3/2018
ES 2357267 4/2011
(Continued)

OTHER PUBLICATIONS

Concept Android Auto App Alerts You Of Pedestrians Before You See Them, https://www.androidpolice.mm/2020/01/10/concept-android-auto-app-alerts-you-of-pedestrians-before-you-see-them/, May 5, 2020.
(Continued)

*Primary Examiner* — Fekadeselassie Girma

(57) ABSTRACT

Aspects of the disclosure relate to using ultrasonic or other types of signals to determine a distance between a transmitter and one or more mobile devices. The distance may be used to facilitate travel on foot or in a vehicle. One aspect disclosed provides a computing platform that may receive ultrasonic sensing data associated with mobile devices in a vehicle from a signal transmitter. Unique identifiers of the mobile devices may be determined. Based on the ultrasonic sensing data and the unique identifier, a relative distance from the signal transmitter to each mobile device in the vehicle may be determined. The computing platform may use a machine learning classifier to determine that a particular occupant is a driver in the vehicle based on the relative distance.

20 Claims, 8 Drawing Sheets

(56) References Cited

U.S. PATENT DOCUMENTS

| | | | | |
|---|---|---|---|---|
| 6,492,906 | B1 | 12/2002 | Richards et al. | |
| 7,015,824 | B2 | 3/2006 | Cleveland et al. | |
| 8,159,338 | B2 | 4/2012 | Breed | |
| 9,843,777 | B2 | 12/2017 | Schofield et al. | |
| 9,963,145 | B2 | 5/2018 | Penilla et al. | |
| 10,068,473 | B1 | 9/2018 | Harrison et al. | |
| 10,139,827 | B2 | 11/2018 | Charette et al. | |
| 10,493,911 | B2 | 12/2019 | Lopez-Hinoiosa et al. | |
| 10,598,782 | B2 | 3/2020 | Kim et al. | |
| 10,685,248 | B1 * | 6/2020 | Sanandaji | G06F 18/23213 |
| 11,194,329 | B2 | 12/2021 | Lehtiniemi | |
| 11,257,370 | B2 | 2/2022 | Aoude | |
| 11,398,149 | B1 * | 7/2022 | Isaac | G08G 1/04 |
| 11,729,307 | B2 * | 8/2023 | Alsolami | H04W 8/22 455/418 |
| 2008/0036623 | A1 * | 2/2008 | Rosen | H04M 3/42357 340/936 |
| 2010/0039291 | A1 | 2/2010 | Harrison et al. | |
| 2011/0183601 | A1 | 7/2011 | Hannon | |
| 2017/0019525 | A1 | 1/2017 | Hannon et al. | |
| 2018/0035326 | A1 * | 2/2018 | Rajapakse | H04W 28/0215 |
| 2019/0025402 | A1 * | 1/2019 | Qu | G01S 11/14 |
| 2021/0338517 | A1 | 11/2021 | Taniguchi | |
| 2021/0365700 | A1 * | 11/2021 | Bravi | G08G 1/0145 |
| 2022/0410906 | A1 * | 12/2022 | Isaac | G06N 20/20 |
| 2024/0265554 | A1 * | 8/2024 | Gronau | G06V 20/593 |
| 2025/0124789 | A1 * | 4/2025 | Isaac | G01S 11/14 |

FOREIGN PATENT DOCUMENTS

| | | |
|---|---|---|
| JP | 2015101332 | 6/2015 |
| KR | 20160050285 | 5/2016 |
| KR | 20180021900 | 5/2018 |
| WO | 2019048332 | 3/2019 |
| WO | 2023278395 | 6/2023 |

OTHER PUBLICATIONS

Van Groeningen, et al., "An Ultrasonic Sensor for Human Presence Detection to Assist Rescue Work in Large 3uildings", ISPRS Annals of the Photogrammetry, Remote Sensing and Spatial Information Sciences, vol. IV-4/1117, 2018, 3rd International Conference on Smart Data and Smart Cities, Oct. 4-5, 2018, Delft, The Netherlands.

Hardiyanto, "Pedestrian Crossing Safety System at Traffic Lights based on Decision Tree Algorithm" (IJACSA) International Journal of Advanced Computer Science and Applications, vol. 10, No. 8, 2019.

Branquinho, et at, "An Efficient and Secure Alert System for VANETs to Improve Crosswalks' Security in Smart Cities" www.mdpi.com/journal/sensors, Published: Apr. 27, 2020.

Wang, "WalkSafe: A Pedestrian Safety App for Mobile Phone Users Who Walk and Talk While Crossing Roads", https://www.semanticscholar.org/paperNValkSafe%3A-a-pedestrian-safety-app-for-mobile-phone-Wang-Cardone/1a129a9864a2b2338e6993b674b65f5bc733a9e1, Feb. 28, 2012.

Indyk D et al.: "Survey of Range Vision Systems", Mechatronics, Pergamon Press, Oxford, GB, vol. 4, No. 4, Jun. 1, 1994 (Jun. 1, 1994), pp. 417-449, XP000450857, ISSN: 0957-4158, DOI: 10.1016/0957-4158.

International Search Report and Written Opinion, PCT/US2022/035245, Dec. 15, 2022.

* cited by examiner

SYSTEMS AND TECHNIQUES FOR ANALYZING DISTANCE USING ULTRASONIC SENSING

CROSS-REFERENCE TO RELATED APPLICATIONS

The present application is a national stage application under 35 U.S.C. § 371 of International Patent Application No. PCT/US2022/035245, filed on Jun. 28, 2022, which claims priority to U.S. non-provisional application Ser. No. 17/360,550, filed Jun. 28, 2021; and U.S. non-provisional application Ser. No. 17/360,361, filed Jun. 28, 2021. Each of these applications is incorporated by reference in their entireties herein.

TECHNICAL FIELD

Aspects of the disclosure relate generally to the processing and management of big data. In particular, aspects of the disclosure relate to detecting driver role or crosswalks using sensing data.

BACKGROUND

When a group of people embark on a road trip, a vehicle may have multiple occupants and each occupant may carry one or more mobile devices. To track a driving pattern and provide insights into the trip, a server in a central office may attempt to communicate with a mobile device of a driver of the vehicle. However, conventional systems may not be able to readily identify which occupant is the driver of the vehicle, particularly when there are multiple mobile devices present simultaneously in a small confined space inside the vehicle. In some cases, the vehicle may cross one or more intersections which may include a crosswalk. A mobile device may be a distraction when a user is engaged in activities such as texting, making phone calls, or listening to music, while crossing a busy crosswalk. Conventional systems may rely on a geolocation of the user to determine the user's whereabout. As a result, conventional systems may fail to detect in time when the user approaches a crosswalk and provide appropriate warnings to mitigate the distractions caused by the mobile device. Aspects described herein may address these and other problems, and generally improve the quality, efficiency, and performance of driver detection and offer insights into the occupants of the vehicle, as well as the timeliness of crosswalk detections and mitigating risks.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Aspects described herein are directed towards driver passenger detection using ultrasonic sensing techniques. In accordance with one or more embodiments, a computing device may receive ultrasonic sensing data associated with various mobile devices from a signal transmitter mounted inside or outside of a vehicle. The signal transmitter may include a high-frequency ultrasonic transmitter. The mobile devices may be associated with different occupants in the vehicle. The computing device may determine a unique identifier associated with each mobile device. Based on the ultrasonic sensing data and the unique identifier, a relative distance from the signal transmitter to each mobile device in the vehicle may be determined. Accordingly, the computing device may determine that a particular occupant is a driver of the vehicle by comparing the relative distances from the signal transmitter to each mobile device.

In one or more instances, the computing device may receive sensor data from a sensor array associated with the vehicle. The sensor array may include an infrared sensor, a sound sensor, a pressure sensor and a motion sensor. Based on the ultrasonic sensing data and the sensor data, the computing device may use a machine learning classifier to determine that the particular occupant is the driver of the vehicle. The machine learning classifier may include a supervised machine learning classifier and an unsupervised machine learning classifier.

In many aspects, the machine learning classifier may be trained using training data comprising predefined labels and the machine learning classifier may output predicted labels for occupants associated the vehicle. The sensor data and the ultrasonic sensing data may be subsequently provided as input to the trained machine learning classifier. The trained machine learning classifier may output a role label of the particular occupant indicating whether the particular occupant is a driver or a passenger of the vehicle.

In many aspects, the computing device may determine a first set of predicted labels with corresponding confidence scores falling below a threshold value. The machine learning classifier may regenerate a second set of predicted labels, and the second set of predicted labels may have confidence scores above the threshold value.

In many aspects, the computing device may receive the ultrasonic sensing data associated with a plurality of frequencies from the signal transmitter. Each frequency may correspond to a mobile device in the vehicle. Alternatively, each frequency may correspond to a communication channel between the signal transmitter and the corresponding mobile device. The computing device may store a frequency signature associated with a particular mobile device in a sensing database system. The frequency signature may indicate a mapping between an identifier of the particular mobile device and a particular frequency that the signal transmitter used to communicate with the particular mobile device.

Aspects described herein are directed towards crosswalk detection using high-frequency transmitters. In accordance with one or more embodiments, a mobile device associated with a user may receive an ultrasonic signal indicating a location of a crosswalk from a signal transmitter located at the crosswalk. The mobile device may monitor a distance from the mobile device to the crosswalk based on the ultrasonic signal. After determining, based on the distance, that the user is within a predetermined vicinity of the crosswalk, the mobile device may generate an alert indicating that the user is proximately located to the crosswalk. After determining, based on the distance, that the user has entered the crosswalk, the mobile device may update the alert to indicate a traffic pattern at the crosswalk.

In one or more instances, the mobile device may send an identifier associated with the mobile device to a gateway device at the crosswalk. For example, the identifier may include a phone number, an IP address or a media access control (MAC) address of the mobile device. The mobile device may subsequently receive promotional content or informational content associated with the user from the gateway device based on the distance.

In many aspects, when the user is within the predetermined vicinity of the crosswalk, the mobile device may generate a sound, a vibration, a ticker, a light, a banner, a pop-up message or an announcement associated with the alert to direct user's attention to the crosswalk. When the user has entered the crosswalk, the mobile device may update the alert to indicate a traffic pattern, such as a change of traffic light or an incoming vehicle at the crosswalk. The mobile device may also turn off a display screen of the mobile device until the user has crossed the crosswalk. The mobile device may determine directional information on user movement (e.g. whether the user moves towards the crosswalk or away from the crosswalk) and an alert may be generated based on the directional information.

In many aspects, the mobile device may receive a plurality of ultrasonic signals from various signal transmitters associated with a plurality of crosswalks, and each ultrasonic signal may indicate a location of the corresponding crosswalk. The mobile device may monitor distances from the mobile device to the plurality of crosswalks based on the ultrasonic signals. After determining that the user is within a vicinity of a particular crosswalk, the mobile device may generate a first alert indicating that the user is proximately located to the particular crosswalk. After determining that the user has entered the particular crosswalk, the mobile device may update the first alert to indicate a first traffic pattern at the particular crosswalk.

In many aspects, a plurality of ultrasonic signals may be received from a plurality of communication channels. Each ultrasonic signal may correspond to a signature frequency associated with a signal transmitter at a crosswalk. Alternatively, the mobile device may send a response signal to a gateway device associated with the particular crosswalk. The response signal may correspond to a signature frequency associated with the mobile device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As a general introduction, aspects described herein are directed towards detecting user movement using high-frequency ultrasonic transmitters and signals to mitigate risks caused by distractions from mobile devices at a crosswalk. In some aspects, ultrasonic transmitters may also be used to determine whether an occupant in a vehicle is a driver of the vehicle.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like. Computer software, hardware, and networks may be utilized in a variety of different system environments, including standalone, networked, remote-access (also known as remote desktop), virtualized, and/or cloud-based environments, among others.

Figure 1:
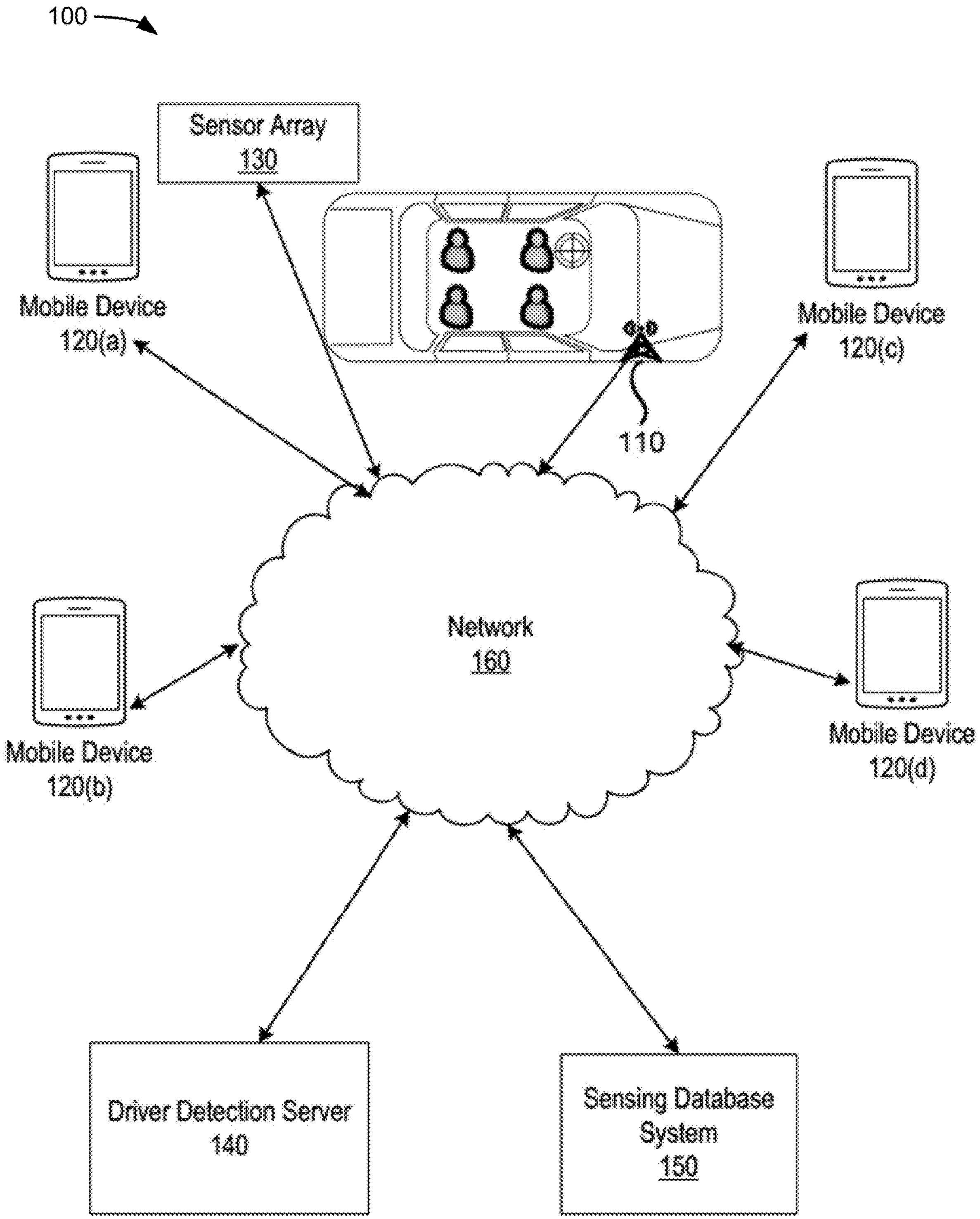
FIG. 1 shows an example of a system for driver passenger detection.

FIG. 1 depicts an illustrative system 100 for driver passenger detection using ultrasonic sensing in accordance with one or more example embodiments. Referring to FIG. 1, a computing environment is shown including one or more computer systems. For example, system 100 may include one or more signal transmitters 110, one or more mobile devices 120, one or more sensor arrays 130, a driver detection server 140, and a sensing database system 150 in communication via network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 7.

Signal transmitter 110 may be adapted to be placed inside or outside a vehicle. For example, signal transmitter 110 may be mounted on a mirror of the vehicle. Signal transmitter 110 may emit an ultrasonic signal with a specific frequency, which may be detected by a device such as a mobile device of an occupant in the vehicle. Signal transmitter 110 may emit high-frequency waves (e.g., short wavelength) of ultrasonic signals. Increasing the number of waves of compression and rarefaction for a given distance may be more accurately discriminate between two separate structures along the axial plane of wave propagation. For example, signal transmitter 110 may use ultrasonic signals with a frequency above 10 megahertz (MHz). Signal transmitter 110 may use a specific frequency that may serve as a frequency signature for the specific signal transmitter. Signal transmitter 110 may use a specific communication channel to communicate with a specific mobile device.

Signal transmitter 110 may broadcast ultrasonic signals to a group of mobile devices within a predefined radius such as inside the vehicle. Using ultrasonic sensing and transmitting, system 100 may transmit unique codes to the mobile devices to uniquely identify a specific mobile device from other mobile devices in the vehicle. Signal transmitter 110 may communicate with the specific mobile devices using unique codes and/or a specific frequency. System 100 may identify a mobile device based on the unique code and measure a relative distance from the signal transmitter 110 to the corresponding mobile device. Signal transmitter 110 may send the measurement of the relative distance to a server in system 100, such as driver detection server 140.

Each of mobile devices 120(*a*), 120(*b*), 120(*c*), or 120(*d*) (collectively referred to as mobile devices 120) may be any device that belongs to an occupant of the vehicle. The occupant may not need to pre-configure mobile devices 120 to use driver detection system 100 or to pair mobile devices 120 with a Bluetooth device in the vehicle. Mobile devices 120 may receive the ultrasonic signal from signal transmitter 110 via an ultrasonic sensor on mobile devices 120. Mobile devices 120 may receive other signals, for example, an infrared signal, or a sound signal. Mobile devices 120 may also include an infrared sensor, a sound sensor, a pressure sensor or a motion sensor. Each of mobile devices 120 may receive a probing signal from signal transmitter 110 and send a response with the unique code or identifier that identifies the mobile device. Each of mobile devices 120 may communicate with signal transmitter 110 using a specific frequency and/or via a specific communication channel. Such specific frequency may be modulated to serve as a frequency signature of the mobile device and the corresponding occupant.

Mobile devices 120 may include computing devices, such as, smart phones, tablets, and the like. According to some examples, mobile devices 120 may include hardware and software that allow them to connect directly to network 160. Alternatively, mobile devices 120 may connect to a local device, such as gateway device, a server, or other computing device, which connects to network 160.

Sensor array 130 may include an infrared sensor, a sound sensor, a pressure sensor and/or a motion sensor. Sensory array 130 may be placed inside or outside the vehicle. An infrared sensor may be an electronic instrument that is used to sense certain characteristics of its surroundings. The infrared sensor may either emit or detect infrared radiation. The infrared sensor may also be capable of measuring the heat being emitted by an object and detecting motion. For example, the infrared sensor may be used as an obstacle detector via transmission of an infrared signal, and this infrared signal may bounce from the surface of an object and the signal may be received at the infrared receiver. As such, the infrared sensor may detect a presence and location of an object, such as an occupant and the mobile device in the vehicle.

In a variety of embodiments, a sound sensor may detect a sound intensity of the environment, which may include a microphone. A pressure sensor may be a device or instrument which is able to measure the pressure in gases or liquids. A pressure sensor may include a pressure-sensitive element which may determine the pressure being applied and components to convert the information into an output signal. For example, the pressure sensor may convert pressure into an analogue electrical signal and the pressure may be measured electronically using pressure transducers and pressure switches. A motion sensor may be an electrical device that utilizes a sensor to detect nearby motion. The motion sensor may emit light (e.g., a laser beam), and then if an object blocks the light, the sensor may be triggered. For example, passive motion sensors may pick up infrared signals put off by body heat. If the passive motion sensor notices an infrared energy, the motion detector may be triggered. The motion detector may detect motion through the principle of Doppler radar, where a continuous wave of microwave radiation may be emitted, and phase shifts in the reflected microwaves due to motion of an object toward or away from the receiver result in a heterodyne signal at a low audio frequency. The motion sensor may use other types of signals, such as ultrasonic signal, or use video camera software or gesture sensor to detect the motion of the occupants. Various sensors in sensor array 130 may generate sensor data and may be combined to verify or complement the determination of the presence and locations of the occupants in the vehicle.

Driver detection server 140 may receive ultrasonic sensing data associated with mobile devices in the vehicle from signal transmitter 110. Driver detection server 140 may determine a unique identifier or a unique code associated with each mobile device, such as a phone number of the mobile device, or an IP address or a MAC address associated with the mobile device. Based on the ultrasonic sensing data and the unique identifier, driver detection server 140 may determine a relative distance from the signal transmitter to each mobile device in the vehicle. Driver detection server 140 may determine whether a particular occupant is a driver in the vehicle by comparing the relative distances from the signal transmitter to each mobile device. Alternatively, driver detection server 140 may use a machine learning classifier to determine whether a role of the occupant is the driver of the vehicle based on the relative distances.

In a variety of embodiments, driver detection server 140 may receive sensor data from sensor array 130. Driver detection server 140 may use a machine learning classifier to determine the role for the particular occupant based on the ultrasonic sensing data and the sensor data. The sensor data may also be used to verify or complement the determination of the presence and locations of the occupants in the vehicle, and the role of the particular occupant.

In a variety of embodiments, driver detection server 140 may receive ultrasonic sensing data associated with a plurality of frequencies, where each frequency may correspond to one mobile device in the vehicle. Each frequency may also correspond to a communication channel between the signal transmitter and the corresponding mobile device. Such frequency may serve as a signature of the mobile device. Driver detection server 140 may storing a frequency signature associated with a particular mobile device in sensing database system 150.

Sensing database system 150 may store data record related to a frequency signature for a mobile device. The data record may include a mapping between an identifier of the particular mobile device and a particular frequency that the signal transmitter used to communicate with the particular mobile device. Sensing database system 150 may store ultrasonic sensing data collected by signal transmitter 110. Sensing database system 150 may also store sensor data collected by sensor array 130. Sensing database system 150 may receive a request from driver detection server 140 to store, update or retrieve a record related to frequency signature, ultrasonic sensing data or sensor data.

Signal transmitters 110, mobile devices 120, sensor arrays 130, driver detection server 140, and sensing database system 150 may be associated with a particular authentication session. Driver detection server 140 may receive, process, and/or store a variety of frequency signatures, identifiers or unique codes, ultrasonic sensing data, sensor data and/or mapping information with sensing database system 150 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 160 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in a data sharing system. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Driver detection system 100 may use ultrasonic signals to determine a relative distance from a signal transmitter to a mobile device that an occupant carries in a vehicle. Based on the relative distances and other types of sensor data, a machine learning classifier may be used to offer insights into the roles of the occupants.

Figure 2:
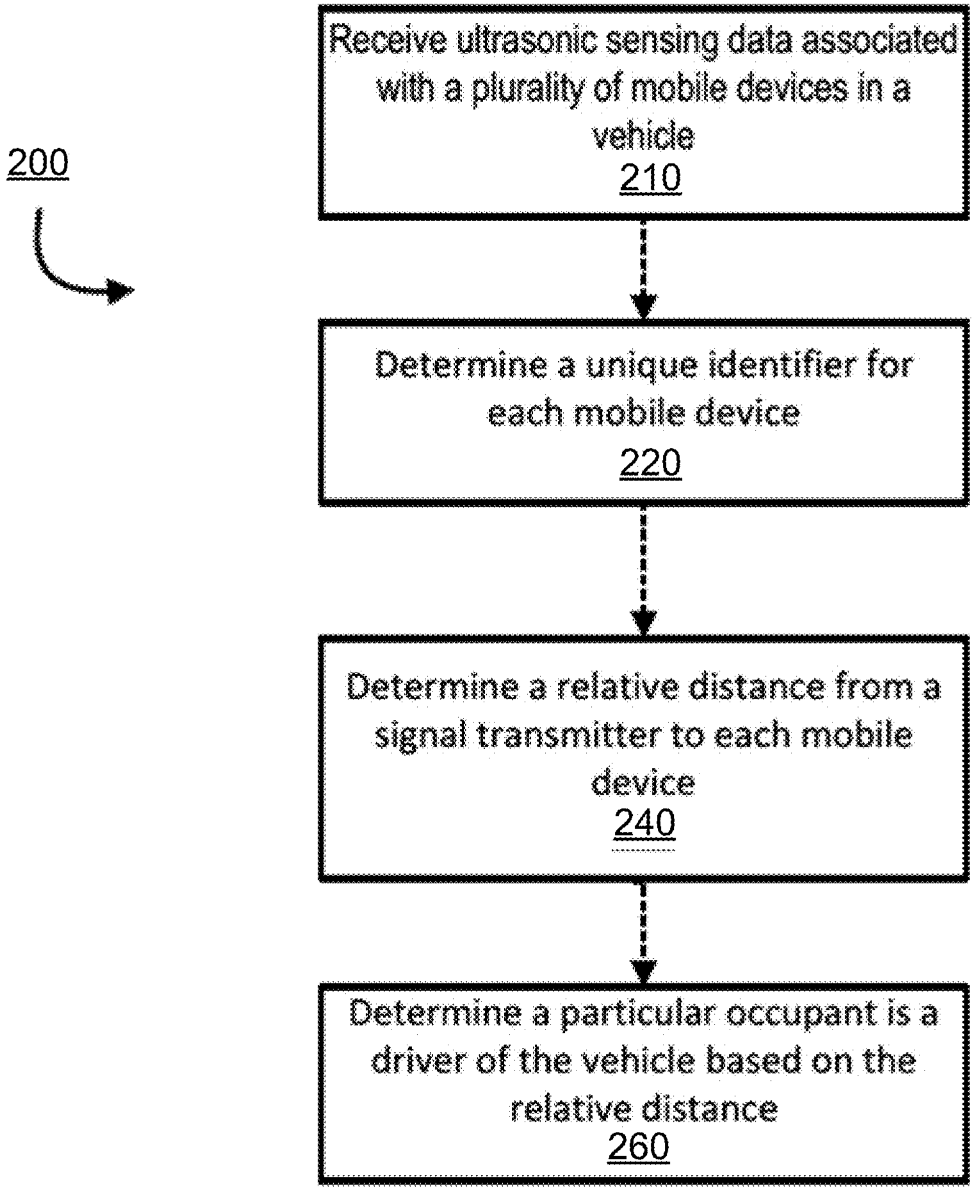
FIG. 2 depicts an illustrative method for driver passenger detection using ultrasonic sensing in accordance with one or more aspects of the disclosure.

FIG. 2 depicts an illustrative method for driver passenger detection in accordance with one or more aspects of the disclosure. Some or all of the steps of process 200 may be performed using one or more computing devices as described herein. In a variety of embodiments, some or all of the steps described below may be combined and/or divided into sub-steps as appropriate.

At step 210, a computing device such as a driver detection server may receive ultrasonic sensing data associated with a plurality of mobile devices in a vehicle. The ultrasonic sensing data may be transmitted by a signal transmitter that may emit an ultrasonic signal. The signal transmitter may be adapted to be placed inside the vehicle or mounted outside the vehicle, such as on a mirror. The signal transmitter may emit high-frequency ultrasonic signals that may be more accurate than using other technologies such as radio frequency, cellular, WiFi or Bluetooth signals to determine a relative distance to an object, particularly when there are multiple mobile devices present inside the vehicle.

There may be multiple occupants in the vehicle, and the signal transmitter may send the ultrasonic signal to a mobile device carried by each occupant. In an embodiment, the mobile device may be a mobile phone. The mobile device may receive the ultrasonic signal from a signal transmitter. The mobile device may detect the ultrasonic signal through an application running in a background of the mobile phone or through the operating system of the mobile phone. The mobile phone may include a sensor to receive the ultrasonic signal. For example, a group of four people may embark on a trip together in a rental car. Each occupant may carry at least one mobile device. Given that the mobile devices may not be readily paired with the rental car via Bluetooth, the computing device may not be aware which mobile device belongs to a driver of the vehicle.

In a variety of embodiments, the computing device may receive sensor data from a sensor array that may include a variety of sensors, such as an infrared sensor, a sound sensor, a pressure sensor and a motion sensor. Sensor data collected from the sensor array may be used to verify or complement the ultrasonic sensing data. For example, if there are four people in the rental car, but the signal transmitter detects there are five mobile devices present in the vehicle. The computing device may use the pressure sensors mounted in the seats to determine there are actually four occupants. An occupant may carry more than one mobile device.

At step 220, the computing device may determine a unique identifier associated with each mobile device. The signal transmitter may send a probe via, for example, the ultrasonic signal to the mobile device and the mobile device may respond with a unique code or identifier associated with the mobile device, such as a phone number of the mobile device, or an IP address or a MAC address associated with the mobile device. The computing device may also use the infrared sensor to send the probing signal to the mobile device. The computing device may use both the ultrasonic and the infrared signals as probing signals. For example, the signal transmitter or an infrared sensor may send a probing signal to each of the five mobile devices in the rental car and receive five unique codes or identifiers respectively.

In a variety of embodiments, the signal transmitter may use a unique sequence to communicate with each mobile device. For example, the signal transmitter may use frequency F1 to communicate with the first mobile device, and receive a unique identifier ID1. The signal transmitter may use frequency F2 to communicate with the second mobile device, and receive a unique identifier ID2. The signal transmitter may use frequency F3 to communicate with the third mobile device, and receive a unique identifier ID3, and so forth. The computing device may store the signature frequency F1 with the corresponding identifier ID1 in a sensing database system. Likewise, frequency signatures F2-F5 may also be stored with ID2-5 respectively in the sensing database system.

At step 240, based on the ultrasonic sensing data and the unique identifier, the computing device may determine a relative distance from the signal transmitter to each mobile device in the vehicle. The signal transmitter may determine a relative distance from the mobile device to the signal transmitter mounted, for example, on the mirror. The signal transmitter may measure the distance using the ultrasonic signal that is transmitted to the mobile device and bounced back to the signal transmitter. The signal transmitter may measure the distance using other types of signals such as infrared, sound or light signals. These other types of signals may also be used to verify the measurement from the ultrasonic signal. The signal transmitter may send information related to the relative distances to the computing device (e.g., the driver detection server.)

At step 260, the computing device may determine that a particular occupant is a driver of the vehicle based on the relative distances. In a variety of embodiments, the computing device may determine the driver based on a comparison of the relative distances. For example, if the signal transmitter is mounted on the driver side mirror, and the computing device received five relative distances D1-D5 corresponding to mobile devices ID1-ID5, respectively. The computing device may determine that the relative distances have the relationships: D1<D2<D3=D4<D5. The computing device may determine that mobile device ID1 with relative distance D1 may be carried by the driver of the vehicle due to its proximity to the signal transmitter. ID2-ID5 may be carried by passengers of the vehicle, and a passenger may carry two mobile devices ID3 and ID4.

In a variety of embodiments, the computing device may use a machine learning classifier to determine the driver of the vehicle based on the relative distances. The machine learning classifier may be more sophisticated in predicting occupant labels or roles (e.g., a driver or a passenger). For example, in the compact sized car, the differences in relative distances for the positions of the mobile devices may have small variations; while in a van or a bus, the differences in relative distances for the positions of the mobile devices may have more substantive variations. In addition to the relative distances, the machine learning classifier may take inputs such as the size or dimension of the vehicle, the make and model of the vehicle, or the position of the signal transmitter into consideration to make more accurate predictions.

In a variety of embodiments, the computing device may use a machine learning classifier to determine the driver of the vehicle based on the ultrasonic sensing data and other types of sensor data from the sensor array. For example, the infrared sensor may determine the presence and relative positions of the occupants. The pressure sensor may determine the presence of the occupants and their relative body weights. The motion sensor may use the video camera software to determine the posture of the occupants and their relative positions in the vehicle. The sound sensor may determine the relative distances of the occupants to the sensor. The machine learning classifier may take some or all this information from various sensors as input and make more accurate predictions. The machine learning classifier may include supervised or unsupervised machine learning classifiers. The training of the machine learning classifier is discussed further in FIG. 3.

It should be readily apparent to one having ordinary skill in the art that a variety of machine learning classifier architectures can be utilized including (but not limited to) decision trees, k-nearest neighbors, support vector machines (SVM), neural networks (NN), recurrent neural networks (RNN), convolutional neural networks (CNN), probabilistic neural networks (PNN), transformer models, and the like. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning classifiers can be utilized, more specific machine learning classifiers when available, and general machine learning classifiers at other times can further increase the accuracy of predictions.

Figure 3:
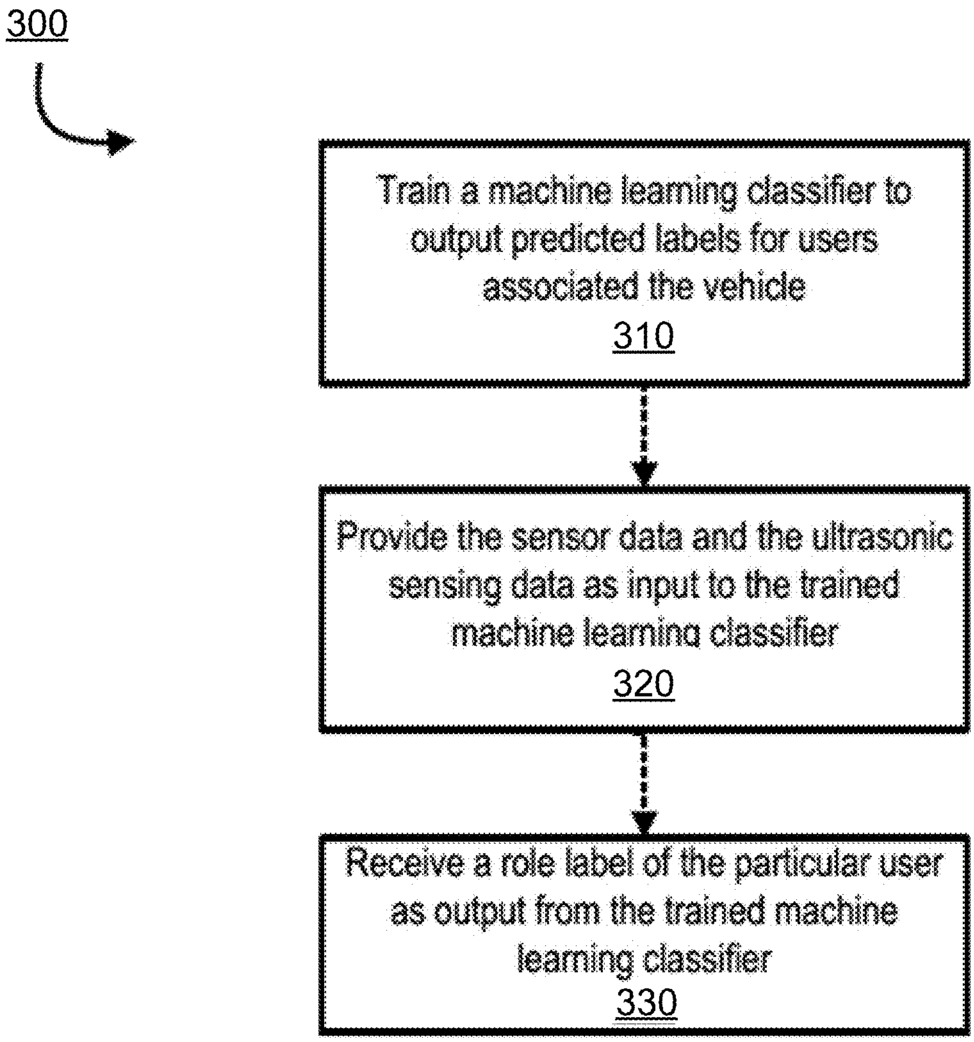
FIG. 3 depicts an illustrative method for training a machine learning classifier in accordance with one or more aspects of the disclosure.

FIG. 3 depicts an illustrative method for training a machine learning classifier in accordance with one or more aspects of the disclosure. Some or all of the steps of process 300 may be performed using one or more computing devices as described herein. In a variety of embodiments, some or all of the steps described below may be combined and/or divided into sub-steps as appropriate.

At step 310, the machine learning classifier may be trained using training data including predefined labels associated a set of occupants in various vehicles. The predefined labels may include a driver role or a passenger role. The training data may also include vehicle related data such as the year/model of the vehicle, the size or the dimension of the vehicle. The training data may include sensor related data such as the positions of the signal transmitter and sensor array, and the types of the sensors. A weight factor may be assigned to a specific type of sensor. For example, a relative greater weight may be assigned to the signal transmitter using ultrasonic signals, and a relative smaller weight may be assigned to a sound sensor. The training data may include occupants related data, such as the number of occupants in the vehicle, the number of mobile devices the occupants carry in the vehicle. The occupants and the mobile devices may have a one to one relationship, or one to many relationship.

In a variety of embodiments, the machine learning classifier may output predicted labels based on the training data. The machine learning classifier may determine a first set of predicted labels on the occupants based on the training data and their corresponding weight factors. Each predicted label may correspond to a confidence score that the machine learning classifier has correctly predicted the labels. If the corresponding confidence scores fall below a threshold value, for example, 95%, the machine learning classifier may regenerate the labels using adjusted weights and training data. After several rounds of iterations, the machine learning classifier may be trained until a confidence score reaches a threshold value, such as 95%. The machine learning classifier may identify an optimal set of weight factors corresponding to the confidence score.

At step 320, the trained machine learning classifier may take the sensor data and the ultrasonic sensing data for occupants in a vehicle as input. At step 330, the trained machine learning classifier may determine a role label of the particular occupant indicating whether the particular occupant is a driver of the vehicle based on the sensor data and the ultrasonic sensing data.

In a variety of embodiments, the ultrasonic sensing may be used to track the storage and movement of a cargo, particularly for high value or controlled products such as tobacco or alcohol. An ultrasonic sensor may be mounted on a cargo pallet, and a signal transmitter may be mounted on a gate of a warehouse. A ledger may be created when the cargo is moved out of the warehouse so that the information related to the chain of custody may be recorded in the ledger.

While usage of distance measurements via ultrasonic sensing data for driver detection is provided as one example, such distance measurements may be used for any suitable process to facilitate travel either on foot or in a vehicle. For example, in some aspects, ultrasonic sensing data may be used to determine a distance of a mobile device to a crosswalk. The distance may be used to determine that a user is within proximity to the crosswalk, based on which one or more alerts may be sent to the user so that the user is aware of the approaching crosswalk, as described in more detail with respect to FIG. 4.

Figure 4:
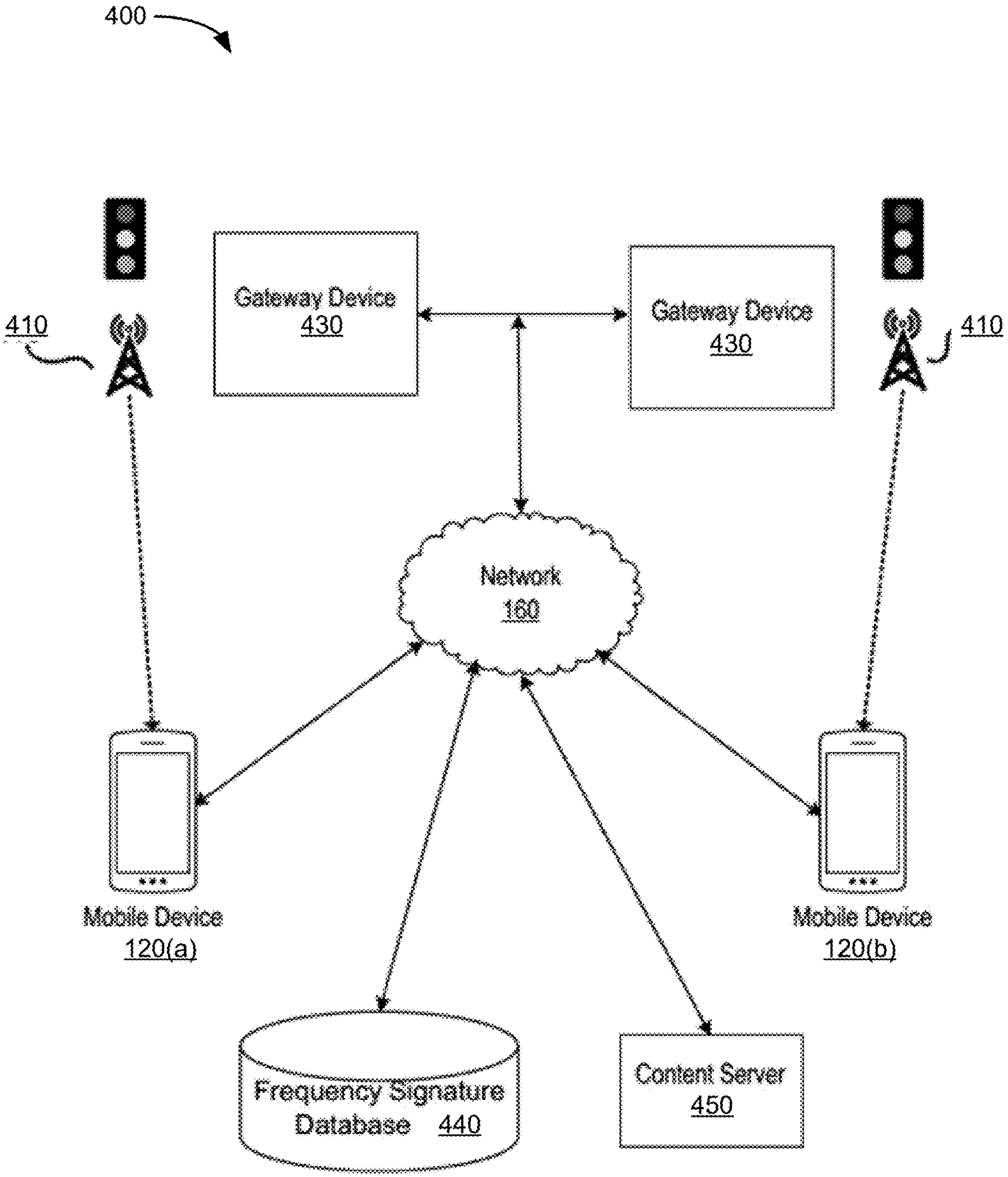
FIG. 4 shows an example of a system for crosswalk detection.

FIG. 4 depicts a system 400 for crosswalk detection using high-frequency transmitters in accordance with one or more example embodiments. Referring to FIG. 4, a computing environment is shown that includes one or more computer systems. For example, the system 400 may include one or more signal transmitters 410, one or more mobile devices 120, one or more gateway devices 430, frequency signature database 440, and content server 450 in communication via network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Signal transmitter 410 may be adapted to be placed at or near a crosswalk and may emit an ultrasonic signal with a specific frequency, which may be detected by a user device such as a mobile device. Signal transmitter 410 may emit high-frequency waves (e.g. short wavelength) ultrasonic signals. Increasing the number of waves of compression and rarefaction for a given distance may more accurately discriminate between two separate structures along the axial plane of wave propagation. For example, signal transmitter 410 may use ultrasonic signals with a frequency above 10 megahertz (MHz). Signal transmitter 410 may use a specific frequency that may serve as a frequency signature for the specific signal transmitter. Signal transmitter 410 may use a specific communication channel that is unique to the specific signal transmitter.

Signal transmitter 410 may broadcast ultrasonic signals to a group of user devices within a predefined radius of the crosswalk. Using ultrasonic sensing and transmitting, system 400 may receive unique codes from the user devices to uniquely identify a specific user device from other user devices approaching the crosswalk. System 400 may communicate with the specific user devices using unique codes and/or a specific frequency. Signal transmitter 410 may identify a user device based on the unique code and measure the distance from the signal transmitter 410 to an approaching object or a receding object such as the user device. Signal transmitter 410 may send the measurement of the distance to the corresponding user device.

User devices such as mobile device 120 may be any device that belongs to a user who may configure mobile device 120 to use crosswalk detection system 400. Mobile device 120 may receive the ultrasonic signal from signal transmitter 410 via an ultrasonic sensor on mobile device 120. Mobile device 120 may also receive information on the distance from signal transmitter 410. Mobile device 120 may monitor the distance from the mobile device to the crosswalk based on the ultrasonic signal and the received information on the distance. Mobile device 120 may determine that the user is within a predetermined vicinity of the crosswalk based on the ultrasonic signal and the distance. For example, the predetermined vicinity may be within a 10 feet or 100 feet radius of the crosswalk. Mobile device 120 may display an alert on the display screen indicating that the user is proximately located to the crosswalk. For example, mobile device 120 may determine that the user is within a ten feet radius of the crosswalk, an alert may be displayed to the user stating "you are approaching the crosswalk. Please click below to acknowledge." Mobile device 120 may also generate a sound, a vibration, a ticker, a light, a banner, a pop-up message, or an announcement with the alert to direct the user's attention to the crosswalk. Mobile device 120 may determine that the user has entered the crosswalk based on the distance, and mobile device 120 may display an updated alert to indicate a traffic pattern at the crosswalk. For example, the alert may state "be aware of incoming traffic" or "the traffic light has changed to red light." Mobile device 120 may also turn off the display screen until the user has safely crossed the crosswalk.

Mobile device 120 may determine or receive directional information of the user movement on whether the user is moving towards the crosswalk or moving away from the crosswalk. An alert may be generated when the user is moving towards the crosswalk. Mobile devices 120 may include computing devices, such as, mobile devices, smart phones, tablets, and the like. According to some examples, mobile devices 120 may include hardware and software that allow them to connect directly to network 160. Alternatively, mobile devices 120 may connect to a local device, such as one or more gateway devices 430, a server, or other computing device, which connects to network 160.

One or more gateway devices 430 may be adapted to be placed at or near a crosswalk. System 400 may include one or more gateway devices 430, which may be interconnected to each other or via a backhaul channel. Gateway devices 430 may be connected to network 160 directly or via the backhaul channel. Gateway device 430 may identify a specific user device based on the unique code of the user device, such as a phone number of the mobile device, an IP address or a MAC address associated with the user device. Gateway devices 430 may probe mobile device 120 and receive a response signal from mobile device 120 including the unique code or identifier. Gateway devices 430 may retrieve promotional content or informational content associated with the user from content server 450 and send the related content to mobile device 120.

Gateway devices 430 may manage frequency signatures of signal transmitter 410 or mobile device 120. Signal transmitter 410 at a first crosswalk may use a first frequency to emit the ultrasonic signal. Signal transmitter 410 at a second crosswalk may use a second frequency to emit the ultrasonic signal. One or more gateway devices 430 may store the frequency signature and the corresponding signal transmitter in frequency signature database 440. Signal transmitter 410 may use a third frequency to communicate with a first mobile device based on the identifier of the first mobile device. Signal transmitter 410 may use a fourth frequency to communicate with a second mobile device based on the identifier of the second mobile device. One or more gateway device 430 may store the frequency signatures associated with the first and second mobile devices in frequency database 440.

One or more gateway device 430 may detect mobile devices within a building or through a city. One or more gateway device 430 may determine a walking or movement pattern using ultrasonic sensing. Such patterns may be used to generate recommendations related to pedestrian traffic flow management, commute route recommendations, event planning, or managing social distance in a pandemic.

Frequency signature database 440 may store data records related to mappings between a frequency signature with a corresponding signal transmitter or a mobile device. Frequency signature database 440 may receive a request from one or more gateway devices 430 and retrieve the corresponding frequency signature for a signal transmitter or a mobile device. Frequency signature database 440 may receive a request from one or more gateway devices 430 and update the corresponding frequency signature for a signal transmitter or a mobile device.

System 400 may include one or more content servers 450, which may host promotional content such as advertisement or informational content such as store operation information to be distributed to appropriate users. Gateway device 430 may retrieve the promotional or informational content tailored for a specific user or a group of users from content server 450 and send to the mobile devices associated with these users.

Signal transmitters 410, mobile devices 120, one or more gateway devices 430, frequency signature database 440, and content server 450 may be associated with a particular authentication session. One or more gateway devices 430 may receive, process, and/or store a variety of frequency signatures, identifiers or unique codes, promotional or informational contents and/or mapping information with frequency signature database 440 and content server 450 as described herein. However, it should be noted that any device in system 400 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 160 may include a local area network (LAN), a wide area network (WAN), a wireless telecommunications network, and/or any other communication network or combination thereof.

The data transferred to and from various computing devices in system 400 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 400 in front of one or more computing devices such that any external devices may communicate directly with the specialized hardware.

Crosswalk detection system (e.g., system 400) may mitigate risks associated with distractions caused by mobile devices at crosswalks. The system may detect, via ultrasonic signals emitted from a signal transmitter, the distance from a specific user to the crosswalk and generate various alerts as the user approaching the crosswalk. The system may detect walking or movement patterns of numerous users in a building or a city, and facilitate decision making in maintaining social distance and managing pedestrian traffic flow.

Figure 5:
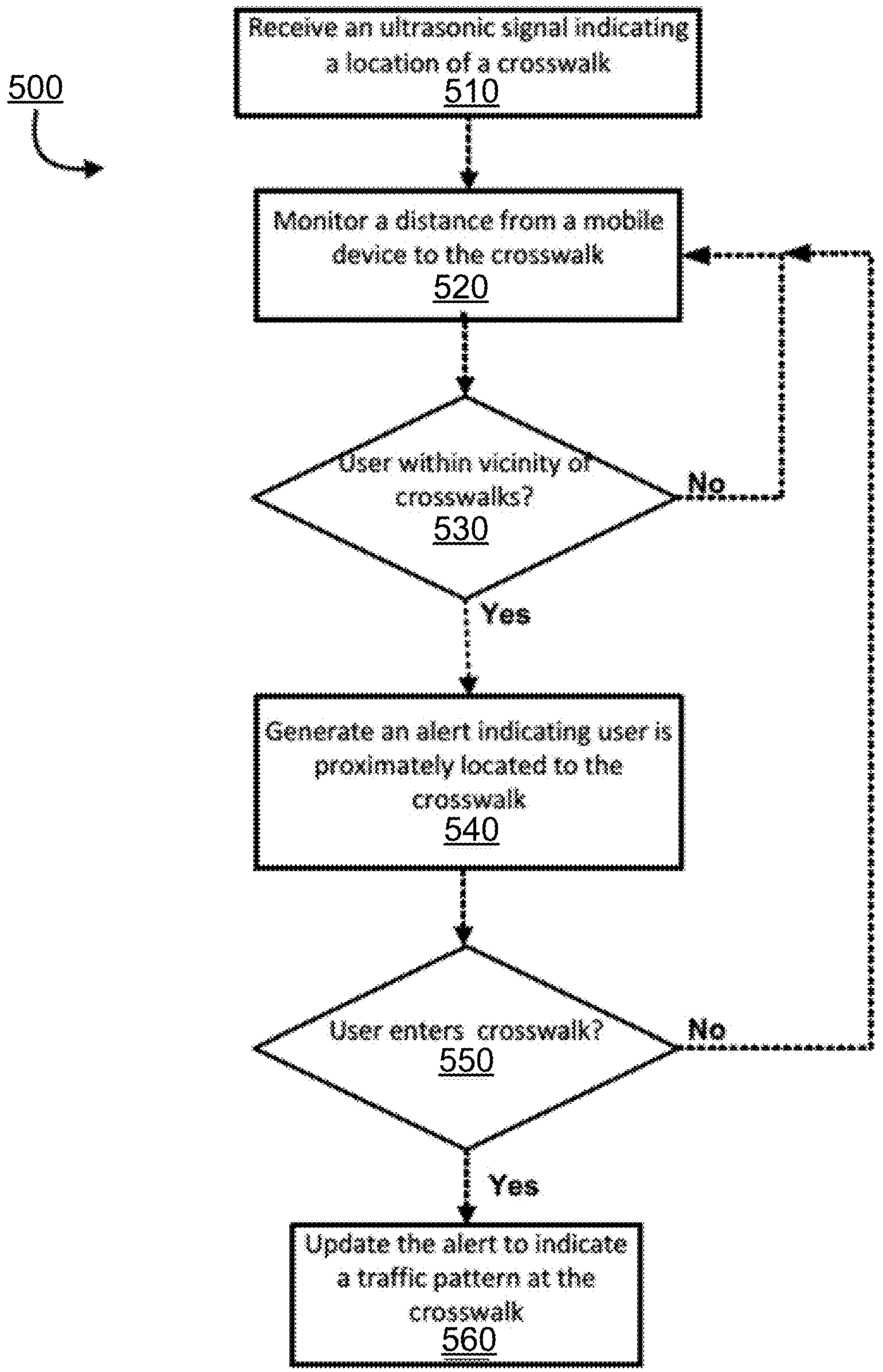
FIG. 5 depicts an illustrative method for crosswalk detection in accordance with one or more aspects of the disclosure.

FIG. 5 depicts an illustrative method for crosswalk detection in accordance with one or more aspects of the disclosure. Some or all of the steps of process 500 may be performed using one or more computing devices as described herein. In a variety of embodiments, some or all of the steps described below may be combined and/or divided into sub-steps as appropriate.

At step 510, a mobile device may receive an ultrasonic signal indicating a location of the crosswalk from a signal transmitter. The signal transmitter may be adapted to be placed at or near the crosswalk. The signal transmitter may emit high-frequency ultrasonic signals that may be more accurate than using other technologies. For example, technologies such as using radio frequency, cellular, Wi-Fi or Bluetooth signals to determine the geolocation of the crosswalk may not be range specific and may not work under certain circumstances.

High-frequency transmitters may be adapted to address the safety issues when a user may be distracted by the mobile device at the crosswalk. Many users may push a button at a crosswalk, wait for the traffic signal to change and step into the crosswalk. They may be using their mobile phone for making a call, texting, or reading an email while walking into the crosswalk and accidents may occur. As result, they may not notice a change in a traffic light or incoming traffic due to the distractions caused by the mobile devices.

The mobile device may detect the ultrasonic signal through an application running in a background of the mobile phone or through the operating system of the mobile phone. The mobile phone may include a sensor to receive the ultrasonic signal. In a variety of embodiments, the signal transmitter may determine a distance from the mobile device to the signal transmitter at the crosswalk. The signal transmitter may measure the distance using the ultrasonic signal that is transmitted to the mobile device and bounced back to the signal transmitter. The signal transmitter may send information related to the distance to the mobile device. In a variety of embodiments, the user device may determine the distance from the mobile device to the crosswalk using ultrasonic sensing techniques.

At step 520, the mobile device may monitor the distance from the mobile device to the crosswalk based on the ultrasonic signal. As the user walks towards the crosswalk or walks away from the crosswalk, the distance changes over time. The mobile device may receive the updated distance information from the signal transmitter. The mobile device may monitor the distance based on the ultrasonic signal as the user approaches the crosswalk or leaves from the crosswalk.

At step 530, the mobile device may determine whether the user is within a predetermined vicinity of the crosswalk based on the distance. If the answer is no, the process may go back to step 520, where the mobile device may continue to monitor the distance from the mobile device to the crosswalk. The predetermined vicinity may be configured by the user. For example, the user may define a radius of 10 feet or 100 feet as the vicinity of the crosswalk. The mobile device may determine whether the user is within a 10 feet or 100 feet radius of the crosswalk. If the answer is yes, the process may go to step 540, where the mobile device may generate an alert indicating that the user is proximately located to the crosswalk. The mobile device may generate and display an alert stating that "you are approaching the crosswalk, please acknowledge." The mobile device may generate a sound, a vibration, a ticker, a light, a banner, a pop-up message or an announcement to direct the user's attention to the crosswalk. The mobile device may require the user to acknowledge the alert. If the user ignores the alert, the mobile device may temporarily cease operation until the acknowledgement is received. Alternatively, the mobile device may increase the frequency, the pitch or the volume of the sound, the vibration, the ticker, the light, the banner, or the announcement in order to get the user's attention. In some embodiments, the mobile device may display a map indicating a location of the user and the distance of the user from the crosswalk as the user approaches the crosswalk.

In a variety of embodiments, the mobile device may determine directional information related to the user's movement. For example, the mobile device may determine whether the user is moving towards the crosswalk or moving away from the crosswalk. In cases where the user is moving away from the crosswalk, the mobile device may display promotional content or other content tailored to the user. In cases where the user is moving towards the crosswalk, the mobile device may display the alert after the user moves within the vicinity of the crosswalk.

In a variety of embodiments, the mobile device may send an identifier or a unique code associated with the mobile device to the gateway device placed at or near the crosswalk. The gateway device may determine, for example, that a user's favorite restaurant or store is in close proximity of the user based on a response signal from the mobile device. The gateway device may retrieve promotional content or informational content related to the resonant or store from a content server. If the user is moving away from the crosswalk, the gateway device may determine it is safe to send such content to the user. The gateway device may subsequently send the promotional or informational content to the user's mobile device. If the user is moving towards the crosswalk and the user is within a vicinity of the crosswalk, the gateway device may determine that it is not safe to send such content to the user. The gateway device may not send the promotional or informational content to the user's mobile device until the user has safely crossed the crosswalk.

At step 550, the mobile device may determine whether the user has entered the crosswalk. If the answer is no, the process may return to step 520 to continue to monitor the distance from the mobile device to the crosswalk. If the answer is yes, the process may go to step 560, where the alert may be updated to indicate a traffic pattern at the crosswalk. For example, the traffic pattern may include a change of traffic light from green to red. The traffic pattern may include an incoming vehicle at the crosswalk. The alert may also indicate that the display screen of the mobile device will be turned off until the user has crossed the crosswalk safely. Alternatively, the alert may be updated with increased frequency, pitch or volume of a sound, a vibration, a ticker, a light, a banner, a pop-up message or an announcement as the user move closer to the crosswalk. The alert may also include warnings for the user to look up and pay attention to the traffic at the crosswalk.

In a variety of embodiments, a user device may receive multiple ultrasonic signals from various signal transmitters at different crosswalks. The signal transmitters may identify the mobile device based on the identifier or unique code of the mobile device. The signal transmitters may each determine a distance from a mobile device to the corresponding crosswalk. The signal transmitters may send the distance information to the mobile device. The mobile device may determine that it is approximately located in a particular crosswalk and send the alert to the user accordingly. As the user enters the particular crosswalk, the alert may be updated to reflect the movement of the user and to direct the user's attention to the traffic pattern at the particular crosswalk.

In a variety of embodiments, based on a frequency signature of the signal transmitter, the mobile device may determine the particular signal transmitter and crosswalk the user is approaching. A signal transmitter may broadcast ultrasonic signals to a group of mobile devices. In a variety of embodiments, based on a frequency signature of the mobile device, the gateway device may determine a particular mobile device that is approaching a particular crosswalk. The gateway device may send an alert to the mobile device and such alert may be displayed on the particular mobile device. In a variety of embodiments, the mobile device may receive ultrasonic signals originating from various signal transmitters via different communication channels. Each communication channel may be used by a specific signal transmitter.

Figure 6A:
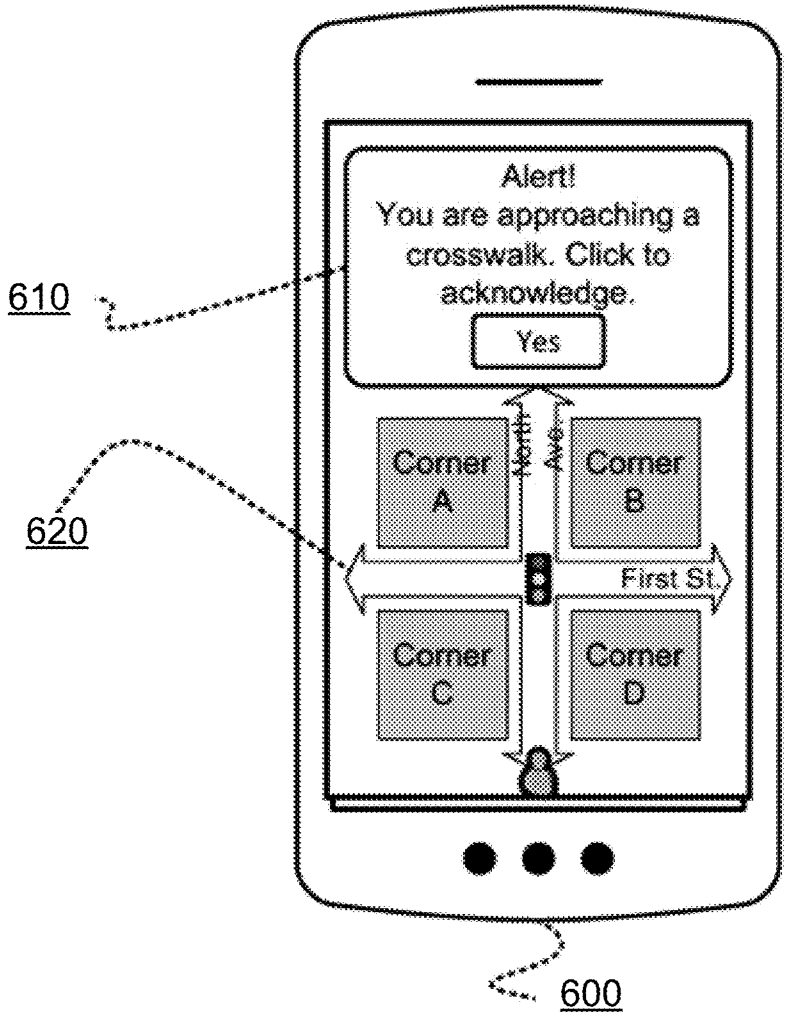
FIGS. 6A-6B show an example of a graphical user interface (GUI) for generating an alert according to one or more aspects of the disclosure.
Figure 6B:
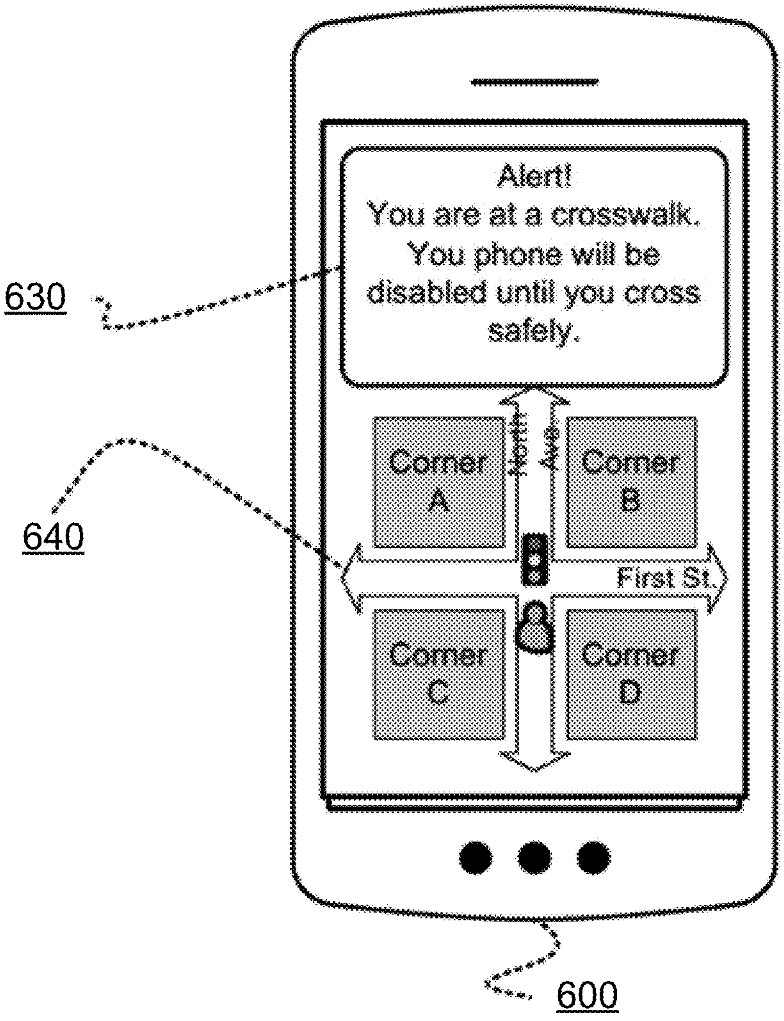

FIGS. 6A-6B show an example of a graphical user interface (GUI) for generating an alert according to one or more aspects of the disclosure. In the example illustrated in FIG. 6A, a notification 610 may be displayed on mobile device 600. As a user approaches a crosswalk at the intersection of First Street and North Ave., a determination may be made that the user is within a predetermined vicinity of the crosswalk, as shown on the map 620. An alert 610 may be displayed to state that the user is approaching a crosswalk. The alert 610 may further ask the user to acknowledge this notification to attract the user's full attention. After the user click "Yes," the alert may be dismissed. If the user fails to acknowledge the alert, the mobile device may be temporarily disabled until the user does so. Alternatively, the mobile device may display an option to ask the user to confirm that the user is not near a crosswalk and dismiss the alert.

In FIG. 6B, as the user moves closer to the crosswalk at the intersection, as shown in map 640 on mobile device 600, an alert 630 may be displayed to the user to indicate that the user has entered the crosswalk. The alert may further notify the user that the phone will be disabled until the user has crossed the crosswalk safely. After a determination that the user has crossed the crosswalk based on the distance between the mobile device and the crosswalk, the phone may be re-enabled automatically.

Figure 7:
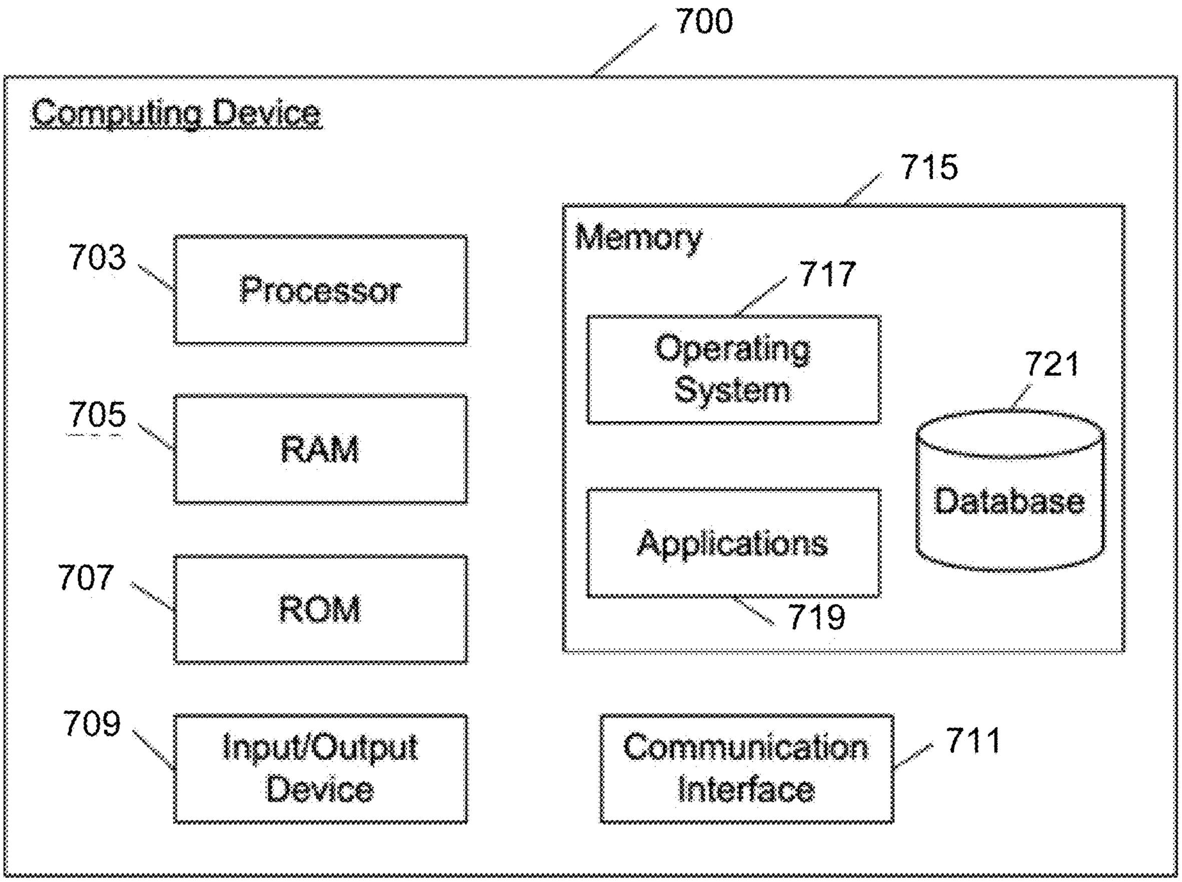
FIG. 7 shows an example of a computing device in accordance with one or more aspects described herein.

FIG. 7 illustrates a computing device 700 that may be used with one or more of the computational systems described herein. The computing device 700 may include a processor 703 for controlling overall operation of the computing device 700 and its associated components, including RAM 705, ROM 707, input/output device 709, communication interface 711, and/or memory 715. A data bus may interconnect processor(s) 703, RAM 705, ROM 707, memory 715, I/O device 709, and/or communication interface 711. In some embodiments, computing device 700 may represent, be incorporated in, and/or include various devices such as a desktop computer, a computer server, a mobile device, such as a laptop computer, a tablet computer, a smart phone, any other types of mobile computing devices, and the like, and/or any other type of data processing device configured to perform the processes and functions described herein.

Input/output (I/O) device 709 may include a microphone, keypad, touch screen, and/or stylus through which a user of the computing device 700 may provide input, and may also include one or more of a speaker for providing audio output and a video display device for providing textual, audiovisual, and/or graphical output. Software may be stored within memory 715 to provide instructions to processor 703 allowing computing device 700 to perform various actions. Memory 715 may store software used by the computing device 700, such as an operating system 717, application programs 719, and/or an associated internal database 721. The various hardware memory units in memory 715 may include volatile and nonvolatile, removable and non-removable media implemented in any method or technology for storage of information such as computer-readable instructions, data structures, program modules, or other data. Memory 715 may include one or more physical persistent memory devices and/or one or more non-persistent memory devices. Memory 715 may include, but is not limited to, random access memory (RAM) 705, read only memory (ROM) 707, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 703.

Communication interface 711 may include one or more transceivers, digital signal processors, and/or additional circuitry and software for communicating via any network, wired or wireless, using any protocol as described herein.

Processor 703 may include a single central processing unit (CPU), which may be a single-core or multi-core processor, or may include multiple CPUs. Processor(s) 703 and associated components may allow the computing device 700 to execute a series of computer-readable instructions to perform some or all of the processes described herein. Although not shown in FIG. 7, various elements within memory 715 or other components in computing device 700, may include one or more caches including, but not limited to, CPU caches used by the processor 703, page caches used by the operating system 717, disk caches of a hard drive, and/or database caches used to cache content from database 721. For embodiments including a CPU cache, the CPU cache may be used by one or more processors 703 to reduce memory latency and access time. A processor 703 may retrieve data from or write data to the CPU cache rather than reading/writing to memory 715, which may improve the speed of these operations. In some examples, a database cache may be created in which certain data from a database 721 is cached in a separate smaller database in a memory separate from the database, such as in RAM 705 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 700 are described separately, functionality of the various components may be combined and/or performed by a single component and/or multiple computing devices in communication without departing from the invention.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computer-implemented method comprising:

receiving, by a computing device and from a signal transmitter in a vehicle, ultrasonic sensing data associated with a plurality of mobile devices in the vehicle, wherein the plurality of mobile devices are associated with a plurality of occupants in the vehicle, wherein the sensing data comprises information specified by ultrasonic signals transmitted by the plurality of mobile devices, the ultrasonic signals being generated by the plurality of mobile devices responsive to the plurality of mobile devices receiving a probe signal from the signal transmitter;

determining, by the computing device, a unique identifier associated with each of the plurality of mobile devices;

determining, based on the ultrasonic sensing data and the unique identifier, a relative distance from the signal transmitter to each of the plurality of mobile devices in the vehicle; and determining that a particular occupant, from the plurality of occupants in the vehicle, is a driver in the vehicle by comparing the relative distance from the signal transmitter to each of the plurality of mobile devices.

2. The method of claim 1, further comprising:

receiving, by the computing device, sensor data from a sensor array associated with the vehicle; and determining, using a machine learning classifier and based on the ultrasonic sensing data and the sensor data, that the particular occupant is the driver of the vehicle.

3. The method of claim 2, wherein the sensor array comprises an infrared sensor, a sound sensor, a pressure sensor and a motion sensor.

4. The method of claim 2, wherein the machine learning classifier comprises a supervised machine learning classifier and an unsupervised machine learning classifier.

5. The method of claim 2, wherein determining, using the machine learning classifier, that the particular occupant is the driver of the vehicle comprises:

prior to using the machine learning classifier, training, using training data comprising predefined labels associated with a set of occupants in the vehicle, the machine learning classifier to output predicted labels for occupants associated with the vehicle;

providing, as input to the trained machine learning classifier, the sensor data and the ultrasonic sensing data; and receiving, as output from the trained machine learning classifier and based on the sensor data and the ultrasonic sensing data, a role label of the particular occupant indicating whether the particular occupant is the driver of the vehicle.

6. The method of claim 5, wherein training the machine learning classifier comprises:

generating, using the machine learning classifier, a first set of predicted labels; determining that the first set of predicted labels have corresponding confidence scores falling below a threshold value; and regenerating, using the machine learning classifier, a second set of predicted labels, wherein the second set of predicted labels have confidence scores above the threshold value.

7. The method of claim 1, wherein the signal transmitter comprises a high-frequency ultrasonic transmitter.

8. The method of claim 1, further comprising:

receiving, from the signal transmitter, the ultrasonic sensing data associated with a plurality of frequencies, wherein each frequency corresponds to one of the plurality of mobile devices in the vehicle.

9. The method of claim 8, wherein each frequency corresponds to a communication channel between the signal transmitter and the corresponding one of the plurality of mobile devices.

10. The method of claim 7, further comprising:

storing, in a sensing database, a frequency signature associated with a particular mobile device, wherein the frequency signature indicates a mapping between an identifier of the particular mobile device and a particular frequency that the signal transmitter used to communicate with the particular mobile device.

11. A computing device comprising:

one or more processors; and memory storing instructions that, when executed by the one or more processors, cause the computing device to:

receive, from a signal transmitter in a vehicle, ultrasonic sensing data associated with a plurality of mobile devices in the vehicle, wherein the plurality of mobile devices are associated with a plurality of occupants in the vehicle, wherein the sensing data comprises information specified by ultrasonic signals transmitted by the plurality of mobile devices, the ultrasonic signals being generated by the plurality of mobile devices responsive to the plurality of mobile devices receiving a probe signal from the signal transmitter;

determine a unique identifier associated with each of the plurality of mobile devices;

determine, based on the ultrasonic sensing data and the unique identifier, a relative distance from the signal transmitter to each of the plurality of mobile devices in the vehicle; and determine that a particular occupant, from the plurality of occupants in the vehicle, is a driver in the vehicle by comparing the relative distance from the signal transmitter to each of the plurality of mobile devices.

12. The computing device of claim 11, wherein the execution of the instructions by the one or more processors causes the computing device to:

receive sensor data from a sensor array associated with the vehicle; and determine, using a machine learning classifier and based on the ultrasonic sensing data and the sensor data, that the particular occupant is the driver of the vehicle.

13. The computing device of claim 12, wherein the sensor array comprises an infrared sensor, a sound sensor, a pressure sensor and a motion sensor.

14. The computing device of claim 12, wherein the machine learning classifier comprises a supervised machine learning classifier and an unsupervised machine learning classifier.

15. The computing device of claim 12, wherein determining, using the machine learning classifier, that the particular occupant is the driver of the vehicle comprises:

prior to using the machine learning classifier, training, using training data comprising predefined labels associated with a set of occupants in the vehicle, the machine learning classifier to output predicted labels for occupants associated with the vehicle;

providing, as input to the trained machine learning classifier, the sensor data and the ultrasonic sensing data; and receiving, as output from the trained machine learning classifier and based on the sensor data and the ultrasonic sensing data, a role label of the particular occupant indicating whether the particular occupant is the driver of the vehicle.

16. The computing device of claim 15, wherein training the machine learning classifier comprises:

generating, using the machine learning classifier, a first set of predicted labels; determining that the first set of predicted labels have corresponding confidence scores falling below a threshold value; and regenerating, using the machine learning classifier, a second set of predicted labels, wherein the second set of predicted labels have confidence scores above the threshold value.

17. The computing device of claim 11, wherein the signal transmitter comprises a high-frequency ultrasonic transmitter.

18. The computing device of claim 11, wherein the execution of the instructions by the one or more processors causes the computing device to:

receive, from the signal transmitter, the ultrasonic sensing data associated with a plurality of frequencies, wherein each frequency corresponds to one of the plurality of mobile devices in the vehicle.

19. The computing device of claim 18, wherein each frequency corresponds to a communication channel between the signal transmitter and the corresponding one of the plurality of mobile devices.

20. The computing device of claim 11, wherein the execution of the instructions by the one or more processors causes the computing device to:

store, in a sensing database, a frequency signature associated with a particular mobile device, wherein the frequency signature indicates a mapping between an identifier of the particular mobile device and a particular frequency that the signal transmitter used to communicate with the particular mobile device.

* * * * *